(12) United States Patent
Ben Dayan et al.

(10) Patent No.: US 11,145,026 B2
(45) Date of Patent: *Oct. 12, 2021

(54) GPU BASED SERVER IN A DISTRIBUTED FILE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka. IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/243,135

(22) Filed: Apr. 28, 2021

(65) Prior Publication Data

US 2021/0248711 A1  Aug. 12, 2021

Related U.S. Application Data

(63) Continuation of application No. 16/273,749, filed on Feb. 12, 2019.

(60) Provisional application No. 62/686,964, filed on Jun. 19, 2018.

(51) Int. Cl.
| | |
|---|---|
| *G06T 1/60* | (2006.01) |
| *G06T 1/20* | (2006.01) |
| *G06F 16/13* | (2019.01) |
| *G06F 16/182* | (2019.01) |
| *G06F 11/10* | (2006.01) |

(52) U.S. Cl.
CPC ............ *G06T 1/60* (2013.01); *G06F 11/1076* (2013.01); *G06F 16/13* (2019.01); *G06F 16/182* (2019.01); *G06T 1/20* (2013.01); *G06F 2211/1028* (2013.01)

(58) Field of Classification Search
CPC ... G06T 1/60; G06T 1/20; G06F 16/13; G06F 16/182; G06F 11/1076; G06F 2211/1028; G06F 11/108

See application file for complete search history.

(56) References Cited

U.S. PATENT DOCUMENTS

| | | |
|---|---|---|
| 6,487,636 B1 | 11/2002 | Dolphin et al. |
| 7,447,839 B2 | 11/2008 | Uppala |
| 7,681,072 B1 | 3/2010 | Gibson et al. |
| 7,793,146 B1 | 9/2010 | Gibson et al. |
| 8,645,749 B2 | 2/2014 | Reche |

(Continued)

OTHER PUBLICATIONS

Int'l Search Report and Written Opinion Appln No. PCT/IB2016/001177 dated Dec. 2, 2016.

(Continued)

*Primary Examiner* — Nurun N Flora
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient stripes is distributed across the plurality of storage devices such that each of the plurality of failure resilient stripes spans a plurality of the storage devices. A graphics processing unit is operable to access data files from the failure resilient stripes, while bypassing a kernel page cache. Furthermore, these data files may be accessed in parallel by the graphics processing unit.

20 Claims, 5 Drawing Sheets

(56) References Cited

U.S. PATENT DOCUMENTS

| | | |
|---|---|---|
| 8,918,478 B2 | 12/2014 | Ozzie et al. |
| 9,087,012 B1 | 7/2015 | Hayes et al. |
| 9,448,887 B1 | 9/2016 | Ben Dayan et al. |
| 2007/0061542 A1* | 3/2007 | Uppala ............... G06F 11/1052 711/173 |
| 2010/0199125 A1 | 8/2010 | Reche |
| 2015/0286438 A1 | 10/2015 | Simionescu et al. |
| 2015/0355971 A1 | 12/2015 | Becker-Szendy et al. |
| 2016/0188252 A1* | 6/2016 | Lee .................... G06F 12/0638 711/103 |
| 2016/0246677 A1 | 8/2016 | Sangamkar et al. |
| 2017/0337103 A1 | 11/2017 | Royer, Jr. |
| 2018/0048559 A1* | 2/2018 | Chou ..................... H04L 45/16 |
| 2019/0005606 A1* | 1/2019 | Yang .................... B60W 50/00 |

OTHER PUBLICATIONS

Int'l Search Report and Written Opinion Appln No. PCT/IB2019/000742 dated May 1, 2020.
Int'l Preliminary Report on Patentability No. PCT/IB2019/000742 dated Dec. 30, 2020.

* cited by examiner

GPU BASED SERVER IN A DISTRIBUTED FILE SYSTEM

PRIORITY CLAIM

The present application is a continuation of U.S. application Ser. No. 16/273,749 filed Feb. 12, 2019, which claims priority to the following application:

U.S. provisional patent application 62/686,964 titled "GPU BASED SERVER IN A DISTRIBUTED FILE SYSTEM" filed on Jun. 19, 2018. Each of the above applications is incorporated by reference herein in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for a distributed file system comprising a GPU substantially as illustrated by and/or described in connection with at least one of the figures, as set forth more completely in the claims.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
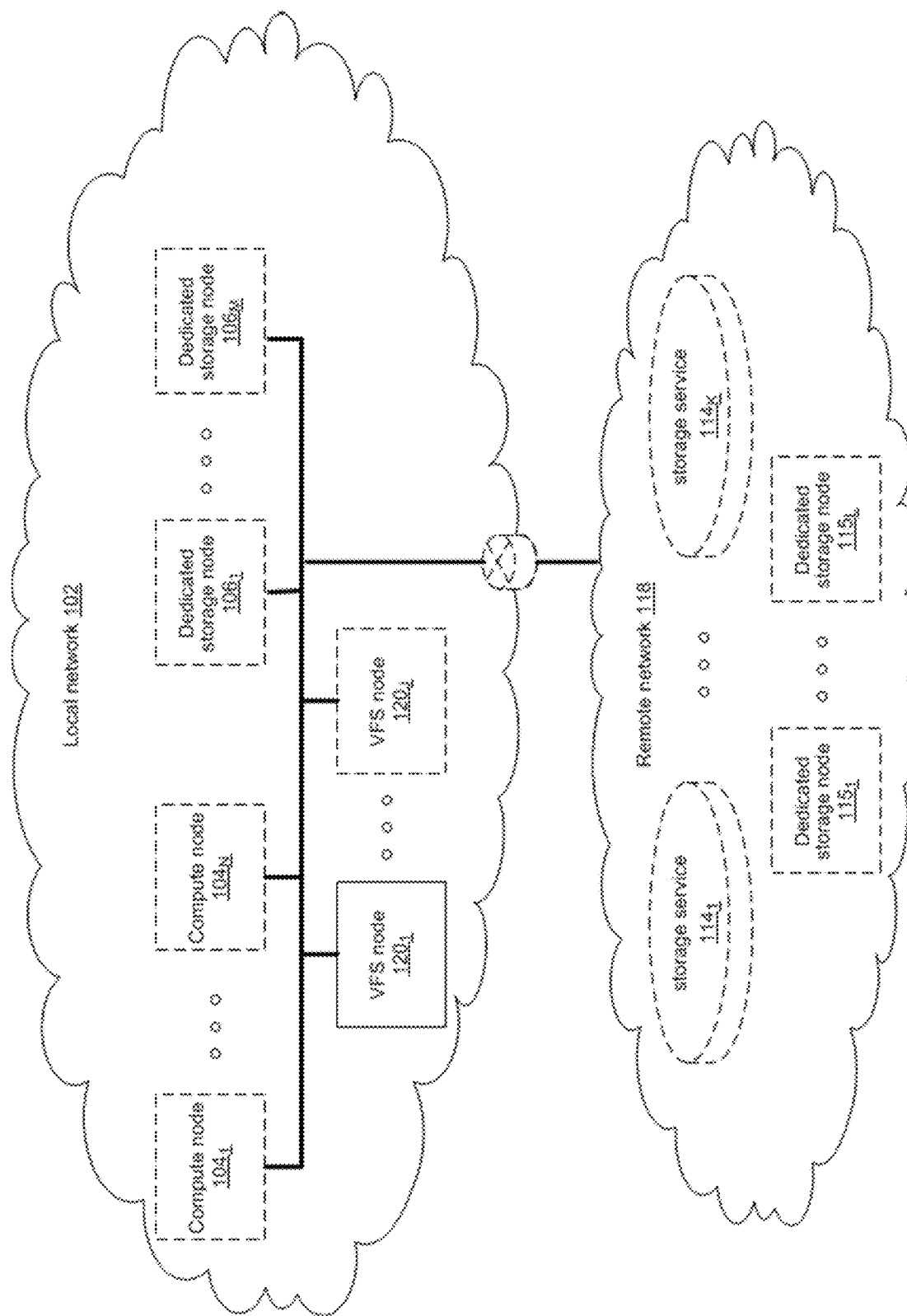
FIG. 1 illustrates various example configurations of a distributed file system in accordance with aspects of this disclosure.

FIG. 1 illustrates various example configurations of a distributed file system in accordance with aspects of this disclosure. Shown in FIG. 1 is a local area network (LAN) 102 comprising one or more nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each node $120_j$ (j an integer, where $1 \leq j \leq J$) is a networked computing device (e.g., a server, personal computer, or the like) that comprises circuitry for running processes (e.g., client processes) either directly on an operating system of the device $104_n$ and/or in one or more virtual machines running in the device $104_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the file system or if the networking hardware is incompatible with the file system requirements.

Figure 2:
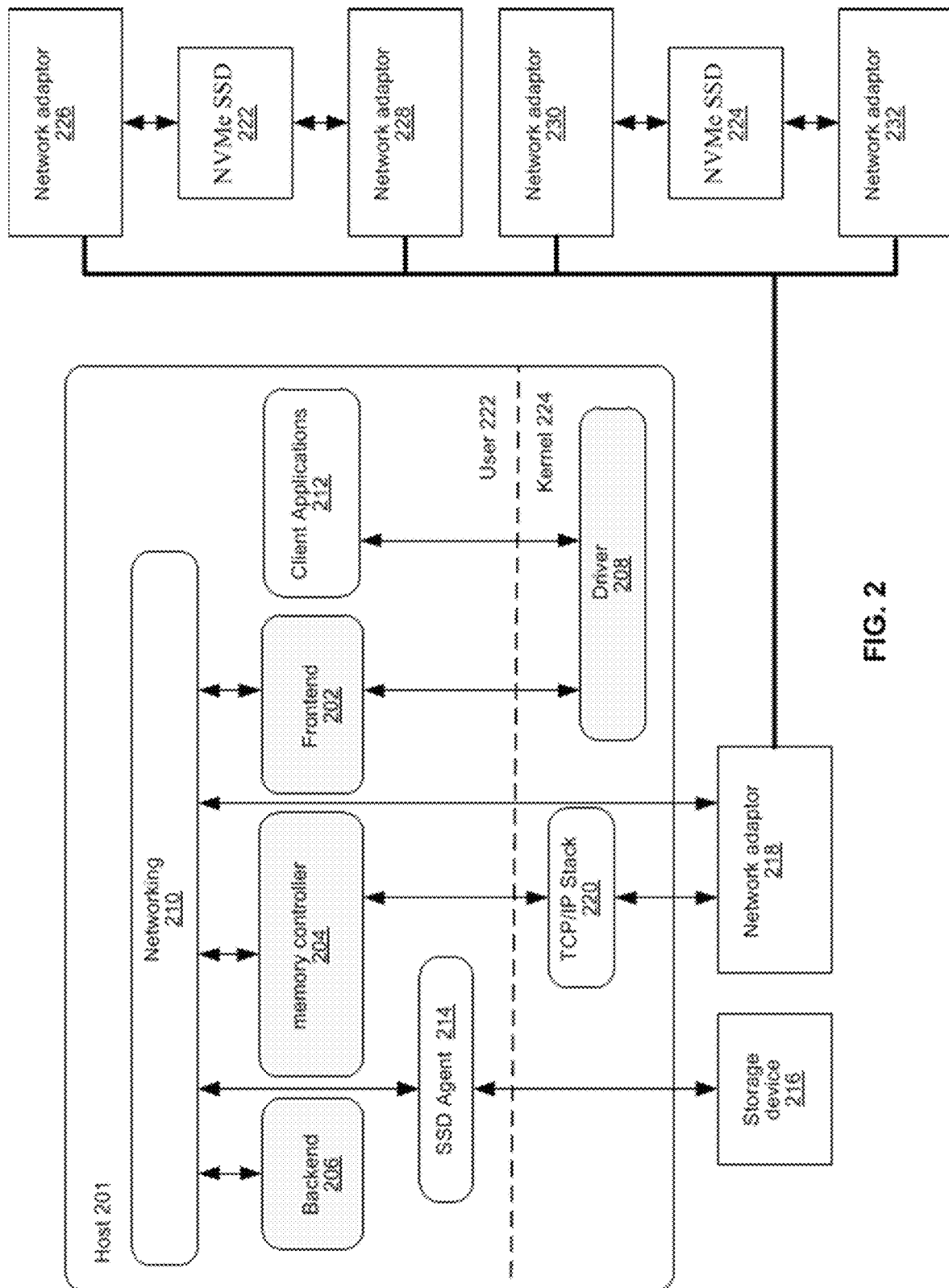
FIG. 2 illustrates an example configuration of a distributed file system node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual file system (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

A VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
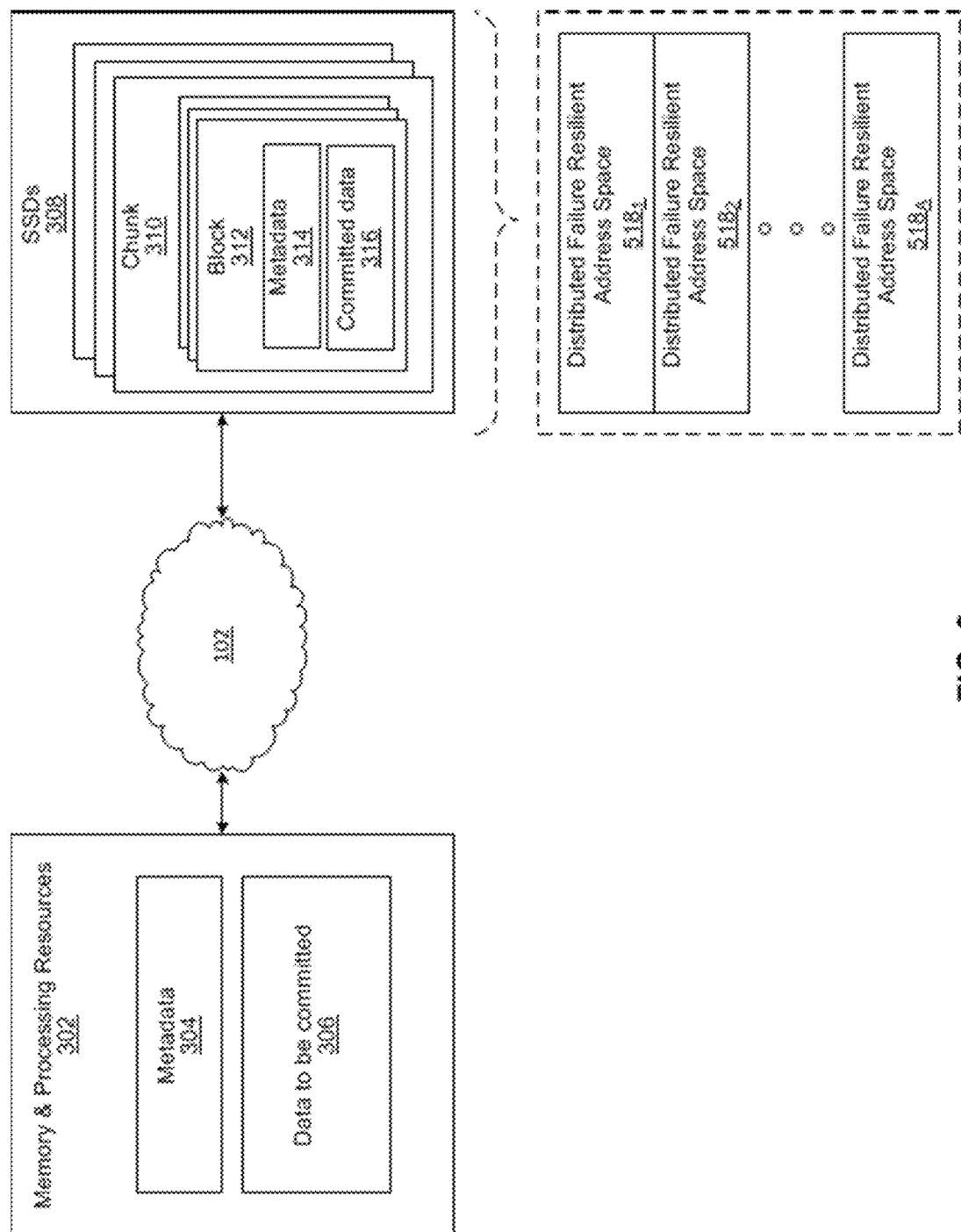
FIG. 3 illustrates another representation of a distributed file system in accordance with an example implementation of this disclosure.

FIG. 3 illustrates another representation of a distributed file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26−5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

A graphics processing unit (GPU) is a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing, and their highly parallel structure makes them more efficient than general-purpose CPUs for algorithms where the processing of large blocks of data is done in parallel. In a personal computer, a GPU can be present on a video card, or it can be embedded on the motherboard or—in certain CPUs—on the CPU die.

The term GPU was popularized by NVIDIA. NVIDIA's GPU was presented as a "single-chip processor with integrated transform, lighting, triangle setup/clipping, and rendering engines."

Figure 4:
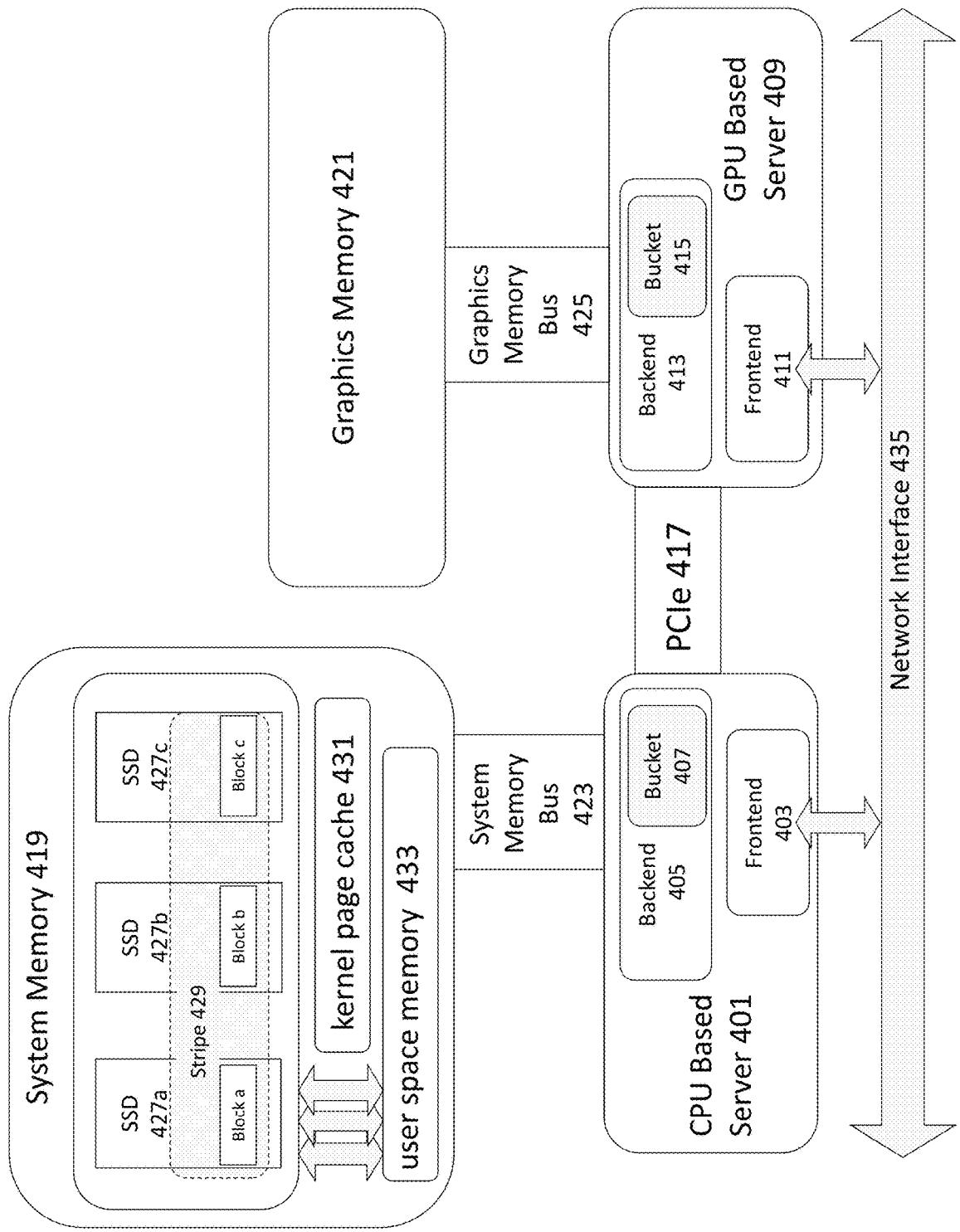
FIG. 4 illustrates an example of in a distributed file system comprising a GPU based server in accordance with an example implementation of this disclosure.

FIG. 4 illustrates an example of in a distributed file system comprising a GPU based server 409 in accordance with an example implementation of this disclosure. In addition to the GPU based server 409, the distributed file system comprises a computing device (e.g., a CPU based server 401) and non-volatile system memory 419 (e.g., a plurality of SSDs 427a, 427b and 427c).

The CPU based server 401 comprises a frontend 403 and a backend 405. The backend 405 comprises at least one bucket 407. The plurality of SSDs 427a, 427b and 427c may be configured into a plurality of blocks, e.g., block a, block b and block c.

Each bucket in a backend is operable to build one or more failure resilient stripes 429 comprising a plurality of blocks. For example, with 10 blocks, 8 blocks of data could be protected with 2 blocks of error protection/correction (i.e., using an 8+2 stripe). Likewise, with 10 failure domains, 6 blocks of data could be protected with 4 blocks of error protection/correction (i.e., using a 6+4 stripe).

For illustration, 3 storage devices and 1 stripe are illustrated in FIG. 4. A different number of storage devices and stripes may be used without deviating from this disclosure. Bucket 407 is operable to build failure resilient stripe 429, which comprises block a, block b and block c. Each storage block of the plurality of storage blocks in a particular failure resilient stripe may be located in a different storage device of the plurality of storage devices.

The GPU based server 409 may be connected to the CPU based server 401 over a PCIe interface 417 and may access the system memory 419 via a system memory bus 423. When the GPU 409 performs computations, however, the GPU 409 uses dedicated GPU memory 421 via a graphics memory bus 425. The dedicated memory for NVIDIA's GPU, for example, is RAM connected directly to the GPU with a high bandwidth memory interface. Thus, data stored on the GPU memory 421 may be transferred from the system memory 419 through the PCIe interface 417.

Data being transferred from the SSDs 427a, 427b and 427c may first be placed in the kernel page cache 431. Then, the data may be copied from the kernel page cache 431 to the application user space memory 433 in the system main memory 419. And finally, the data may be copied from the application user space memory 433 into the GPU memory 421. Since many GPU applications do not need to access system main memory, there are two wasted copies. Further, these GPU applications are very performance sensitive, so getting data directly to the GPU memory is important.

The Portable Operating System Interface (POSIX) is a family of standards specified by the IEEE Computer Society for maintaining compatibility between operating systems. When standard POSIX applications are written, they assume that files are being kept open for a long time. The standard POSIX process comprises finding the inode (a series of lookup requests), opening the file, accessing the file, and finally closing. If a file is open for a long time, the standard POSIX process is useful.

GPU based applications, however, deal with a large number of small files (e.g., images, voice samples, text snippets, etc.) in the GPU memory. The POSIX overhead in GPU based applications is quite high.

In accordance with one or more embodiments of the present disclosure, when an application uses GPU data, the data may be read directly from a distributed file system that comprises both system memory 419 and graphics memory 421. For example, the graphics processing device 409 may be operable to transfer storage blocks a, b or c to the volatile memory device 421 while bypassing the kernel page cache 431. GPU based applications may be provided to place the content of the small files in user-space memory 433 of the applications, thereby bypassing the POSIX protocol and the kernel page cache 431 and adjusting efficient key-value accesses. Furthermore, the graphics processing device 409 may be operable to access a plurality of storage blocks in parallel via a high bandwidth interface from the SSDs 427a, 427b and 427c.

The GPU based application may provide a string of a complete file name (e.g., "/dir1/dir2/ . . . /dirN/filename") and a memory location. The system will communicate directly with the user space front end and bypass the kernel driver altogether. The system may fetch the contents of the GPU based application files in parallel and place them in the GPU memory 421, thereby eliminating the POSIX overhead. Also, by eliminating the need to copy to and from the kernel page cache 431, latency may be reduced. The GPU application may copy the data over the PCIe interface 417 to GPU memory 421 and notify the GPU 409 that processing may begin (e.g., by ringing a doorbell). For example, the computing device frontend 403 may indicate to a GPU and/or the GPU based server 409 that data required for a graphics operation is available in the volatile memory device 421.

Once the frontend 403 verifies that data is fully placed in GPU memory 421, the frontend 403 may notify the GPU application that the data is there, so then the user application can launch the GPU procedure to work on that data. However, because waking up a GPU client application also takes time and increases latency, the application may store the GPU procedure in the GPU, and the GPU may wait for a doorbell (i.e., an indication to the hardware) that all the data is placed in the right location. The frontend 403 can then ring the doorbell of the GPU to start processing the data.

Data may also be written directly into GPU memory 421. Instead of instructing the CPU based sever 401 (e.g., on a network interface card) to write the incoming packets to system memory 419, data packets may be written to GPU memory 421 using GPU-Direct and RDMA techniques. With direct GPU memory access, a key-value access will place data directly in GPU memory 421.

The GPU based server 409 may comprise a GPU frontend 411 and a GPU backend 413. The GPU backend 413 may comprise at least one GPU bucket 415. The bucket 415 on the GPU backend 413 may be operable to manage data in the volatile memory device 421. The computing device 401 and the graphics processing device 409 may be coupled via a network interface 435. The GPU frontend 411 may determine a location of data required for a graphics operation. This data may be received directly over the network interface 435 from a computing device. For example, the GPU frontend 411 may be in communication with the frontend 403, which may determine that data required for a graphics operation is located in a failure-protected stripe 429 that is led by a bucket 407 in a backend 405 of the computing device 401. The GPU frontend 411 may indicate to a graphics processing unit (GPU) when data required for a graphics operation is available in the volatile memory device 421.

Figure 5:
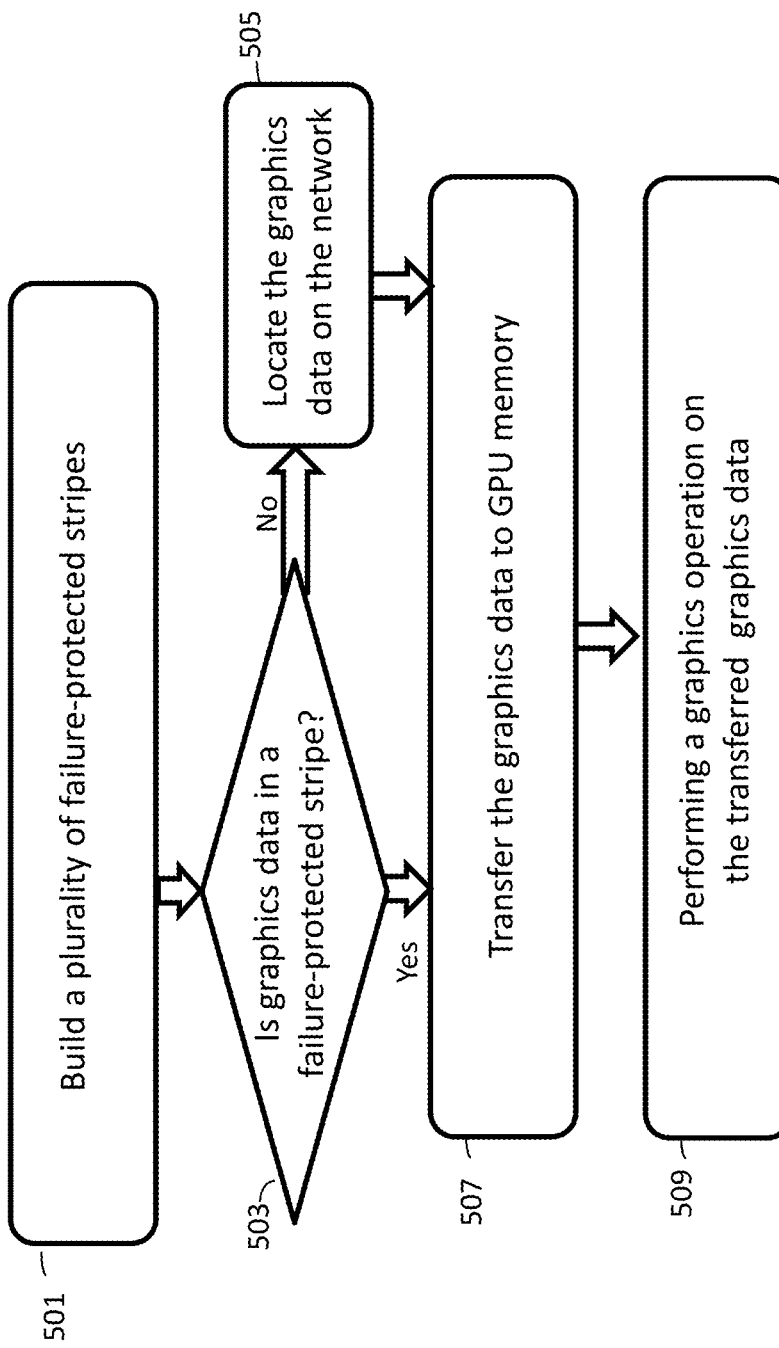
FIG. 5 is a flowchart illustrating an example method for using a GPU based server in a distributed file system.

FIG. 5 is a flowchart illustrating an example method for using a GPU in a distributed file system. In block 501, a plurality of failure-protected stripes is built using a computing device, such that each of the plurality of failure-protected stripes comprises a plurality of storage blocks and each storage block of the plurality of storage blocks is located in a different flash memory device of a plurality of flash memory devices.

In block 503, the location of data for a graphics operation is determined. If data for a graphics operation is located in a failure protected-stripe, the graphics data in one or more blocks of a failure resilient stripe is transferred to a volatile memory device in block 507. This data may be transferred in parallel over a high bandwidth bus that bypasses the kernel page cache. In block 509, the graphics operation may be performed on the transferred data using a graphics processing device.

If data for the graphics operation is not located in a failure protected-stripe, the graphics data may transferred directly to a volatile memory device from the network via a network interface in block 505. Once the data required for the graphics operation is available in the volatile memory device, the availability is indicated to the GPU.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system, the system comprising:
 a central processing unit (CPU);
 a CPU memory running an operating system (OS) of the CPU;
 an accelerator operably coupled to the CPU via a bus;
 an accelerator memory operably coupled to the accelerator; and
 a plurality of storage devices operably coupled to the CPU, wherein:
  the plurality of storage devices is logically segmented into a plurality of stripes, no two stripes of the plurality of stripes span the same group of storage devices, and
  the CPU is configured to write data, from any of the plurality of stripes, into the accelerator memory, while bypassing the OS and the CPU memory.

2. The system of claim 1, wherein the accelerator comprises a graphics processing unit (GPU).

3. The system of claim 1, wherein the CPU memory comprises a random access memory (RAM).

4. The system of claim 1, wherein the accelerator is located on a network interface card (NIC).

5. The system of claim 1, wherein the CPU is located on a NIC.

6. The system of claim 1, wherein the accelerator and the CPU are operably coupled via a PCI Express (PCIe) bus.

7. The system of claim 1, wherein a distributed filesystem comprises the plurality of storage devices and the CPU.

8. The system of claim 1, wherein writing from a stripe of the plurality of stripes into the accelerator memory bypasses a kernel page cache.

9. The system of claim 1, wherein:
the accelerator is operable to determine that data required for an operation is located in a stripe of the plurality of stripes; and
a frontend interface is operable to notify the accelerator when the data is available in the local memory.

10. The system of claim 1, wherein writing data into the accelerator memory comprises using RDMA.

11. A method, the method comprising:
generating a plurality of stripes, via one or more compute nodes, by segmenting a plurality of storage devices, wherein no two stripes of the plurality of stripes span the same group of storage devices,; and
writing data, via a bus from any of the plurality of stripes, into an accelerator memory used by an accelerator, wherein writing the data comprises bypassing an operating system mechanism used for an access of the plurality of stripes.

12. The method of claim 11, wherein the accelerator comprises a graphics processing unit (GPU).

13. The method of claim 11, wherein the accelerator memory comprises a random access memory (RAM).

14. The method of claim 11, wherein the accelerator and the accelerator memory are located on a network interface card (NIC).

15. The method of claim 11, wherein a compute node of the one or more compute nodes is located on a NIC.

16. The method of claim 11, wherein the accelerator and a compute node of the one or more compute nodes are operably coupled via a PCI Express (PCIe) bus.

17. The method of claim 11, wherein a distributed file system comprises the plurality of storage devices and at least one of the one or more compute nodes.

18. The method of claim 11, wherein the method comprises:
configuring a compute node, of the one or more compute nodes, to write into the accelerator memory via a key-value access; and
writing data, from a stripe of the plurality of stripes, into the accelerator memory bypasses a kernel page cache.

19. The method of claim 11, wherein the method comprises notifying the accelerator when the data is available in the local memory.

20. The method of claim 11, wherein the method comprises determining, via a frontend interface, when data required for an operation is located in a stripe of the plurality of stripes.

* * * * *